US010487658B2

(12) United States Patent
Kawashima et al.

(10) Patent No.: US 10,487,658 B2
(45) Date of Patent: Nov. 26, 2019

(54) TURNING DEVICE

(71) Applicant: MITSUBISHI HEAVY INDUSTRIES COMPRESSOR CORPORATION, Tokyo (JP)

(72) Inventors: Hirokazu Kawashima, Hiroshima (JP); Masataka Yamada, Hiroshima (JP); Manu Agarwal, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 322 days.

(21) Appl. No.: 15/503,107

(22) PCT Filed: Oct. 30, 2014

(86) PCT No.: PCT/JP2014/078911
§ 371 (c)(1),
(2) Date: Feb. 10, 2017

(87) PCT Pub. No.: WO2016/067411
PCT Pub. Date: May 6, 2016

(65) Prior Publication Data
US 2017/0226858 A1    Aug. 10, 2017

(51) Int. Cl.
*F01C 20/04*    (2006.01)
*F01D 25/36*    (2006.01)
(Continued)

(52) U.S. Cl.
CPC .............. *F01C 20/04* (2013.01); *F01D 25/36* (2013.01); *F03D 7/0276* (2013.01); *F16H 3/34* (2013.01);
(Continued)

(58) Field of Classification Search
CPC ........ F01C 20/04; F01D 25/36; F03D 7/0276; F16H 3/34; H02K 7/1185; F16D 11/16
See application file for complete search history.

(56) References Cited

U.S. PATENT DOCUMENTS 3,021,719 A  *  2/1962  Conrad, Jr. ............. F01D 25/36
                                                    477/19
4,750,371 A  *  6/1988  Kobayashi .............. G01L 3/105
                                                    310/68 B
(Continued)

FOREIGN PATENT DOCUMENTS

CN        2739362 Y     11/2005
CN       101787905 A     7/2010
(Continued)

OTHER PUBLICATIONS

Written Opinion of the International Searching Authority and International Search Report (forms PCT/ISA/237 and PCT/ISA/210), dated Feb. 3, 2015, for International Application No. PCT/JP2014/078911, with English translations.

*Primary Examiner* — Huan Le
(74) *Attorney, Agent, or Firm* — Birch, Stewart, Kolasch & Birch, LLP

(57) ABSTRACT

A turning device (30) includes an electric motor (41), a moving gear (53) configured to move between a first position (P1) at which rotation of an output shaft (43) of the electric motor (41) is able to be transmitted to a rotor (11) and a second position (P2) at which rotation of the output shaft (43) is unable to be transmitted to the rotor (11), a movement mechanism (60) configured to move the moving gear (53) between the first position (P1) and the second position (P2), a torque detection unit (44) configured to detect a torque of the output shaft (43) of the electric motor (41), and a control device (61) configured to control the movement mechanism (60) to move the moving gear (53)

(Continued)

from the first position (P1) to the second position (P2) based on the torque detected by the torque detection unit (44).

6 Claims, 3 Drawing Sheets

(51) Int. Cl.
*F16H 3/34* (2006.01)
*F03D 7/02* (2006.01)
*H02K 7/118* (2006.01)

(52) U.S. Cl.
CPC ....... *H02K 7/1185* (2013.01); *H02K 2207/03* (2013.01)

(56) References Cited

U.S. PATENT DOCUMENTS

| | | |
|---|---|---|
| 4,905,810 A | 3/1990 | Bahrenburg |
| 2012/0216634 A1 | 8/2012 | Tsakiris et al. |
| 2015/0053029 A1 | 2/2015 | Sasaki et al. |

FOREIGN PATENT DOCUMENTS

| | | |
|---|---|---|
| CN | 102510945 A | 6/2012 |
| CN | 202280488 U | 6/2012 |
| CN | 202718719 U | 2/2013 |
| EP | 1 696 105 A2 | 8/2006 |
| JP | 53-105615 A | 9/1978 |
| JP | 9-256810 A | 9/1997 |
| JP | 2000-320621 A | 11/2000 |
| JP | 2012-177328 A | 9/2012 |
| WO | WO 2013/124979 A1 | 8/2013 |

\* cited by examiner

TURNING DEVICE

TECHNICAL FIELD

The present invention relates to a turning device configured to rotate a turbine rotor included in a steam turbine or the like.

BACKGROUND ART

When a turbine rotor is left in a non-rotation state at a high temperature during shutdown of a steam turbine or the like, bending in the turbine rotor may occur due to distortion by heating generated in a turbine rotor due to a temperature difference generated in a turbine casing in association with a decrease in temperature of steam or a gas in the turbine or the weight of the turbine rotor. Here, in order to avoid the occurrence of bending in the turbine rotor used in the steam turbine or the like, during shutdown of the steam turbine and before starting the steam turbine, turning that rotates the turbine rotor for a predetermined time at a low speed should be performed. In order to perform such turning, a turning device configured to rotate the turbine rotor using power of an electric motor is widely used.

In such a turning device, when regular rotation of the turbine rotor starts, in order to prevent the turning device from being overloaded and the turning device from being damaged, a mechanism configured to separate a pinion gear to protect the turning device is provided. Meanwhile, as a backflow or the like of a compressor process gas occurs during turning of the steam turbine or the like, the turbine rotor may be reversely rotated. In this case, the pinion gear cannot be separated, an excessive load is applied to the turning device and the turning device may be damaged.

In order to avoid damaging the turning device, for example, in Patent Literature 1, a one way clutch configured to automatically separate the turning device from the turbine rotor and a one way clutch (a reverse rotation preventing apparatus) configured to prevent (restrict) reverse rotation of the turning device when a rotational speed of the turbine rotor exceeds the rotational speed of the turning device are provided.

CITATION LIST

Patent Literature

[Patent Literature 1]
Japanese Unexamined Patent Application, First Publication No. 2012-177328

SUMMARY OF INVENTION

Technical Problem

However, in the above-mentioned turning device, in order to prevent (restrict) the reverse rotation of the turbine rotor using the one way clutch, the one way clutch stops a reverse rotation torque of the turbine rotor. The one way clutch has a load larger when the reverse rotation of the turbine rotor is prevented, than during regular rotation. For this reason, due to damage to the one way clutch caused by the load upon reverse rotation, a frequency of replacement or repair of the one way clutch or the turning device may be increased.

The present invention is directed to provide a turning device capable of preventing a turning device from receiving an excessive load upon reverse rotation of a turbine rotor and reducing the replacement and repair frequency of the turning device.

Solution to Problem

In order to solve the aforementioned problems, the present invention employs the following means.

According to a first aspect of the present invention, a turning device includes: an electric motor; a moving gear configured to move between a first position at which rotation of an output shaft of the electric motor is able to be transmitted to a rotor and a second position at which rotation of the output shaft is unable to be transmitted to the rotor; a movement mechanism configured to move the moving gear between the first position and the second position; a torque detection unit configured to detect a torque of the output shaft of the electric motor; and a control device configured to control the movement mechanism to move the moving gear from the first position to the second position based on the torque detected by the torque detection unit.

When a force of causing the rotor to be transitioned from regular rotation to reverse rotation due to a backflow or the like of a process gas of a compressor is generated, first, the regular rotation of the rotor is stagnated. Here, in the turning device, since the rotor is to be regularly rotated continuously, the torque of the output shaft of the electric motor is increased to an extent that the regular rotation of the rotor is stagnated. According to the above-mentioned configuration, the control device can determine that the rotor is to be reversely rotated by detecting a variation in torque. Accordingly, the control device can control to detect a reverse rotation symptom of the rotor and move the moving gear to the second position before the reverse rotation of the rotor starts. For this reason, when the reverse rotation of the rotor actually starts, movement of the moving gear to the second position is terminated. Accordingly, the turning device can be avoided from receiving an excessive load due to the reverse rotation of the rotor.

In addition, as the control device controls the movement mechanism based on the torque detected by the torque detection unit, the position of the moving gear can be automatically varied. Accordingly, work loads such as monitoring a state of the rotor, an operation of the turning device, and so on, performed by the operator, can be reduced. In addition, a risk of the turning device receiving an excessive load due to reverse rotation of the rotor without detection of the reverse rotation of the rotor caused by oversight or the like of the operator can be reduced.

According to a second aspect of the present invention, in the first aspect, the control device controls the movement mechanism to move the moving gear from the first position to the second position when a displacement per unit time of the torque detected by the torque detection unit exceeds a constant value.

When the regular rotation of the rotor is stagnated by the backflow or the like of the process gas of the compressor, the torque of the output shaft of the electric motor is varied (increased). Further, when the force of causing the rotor to be transitioned from the regular rotation to the reverse rotation is increased, the displacement per unit time of the torque is increased. According to the above-mentioned configuration, as the control device detects that the displacement per unit time of the torque exceeds a constant value, the control device can determine that the rotor is to be reversely rotated. Accordingly, the control device can control to detect a reverse rotation symptom of the rotor and move the moving gear to the second position before reverse rotation of the rotor starts. For this reason, when the reverse rotation of the rotor actually starts, movement of the moving gear to the second position is terminated. Accordingly, the turning device can be avoided from receiving an excessive load due to the reverse rotation of the rotor. In addition, since the control device is configured to automatically control these operations, the work load such as monitoring the state of the rotor by the operator or the like can be reduced.

According to a third aspect of the present invention, in the first aspect, the control device controls the movement mechanism to move the moving gear from the first position to the second position when the torque detected by the torque detection unit exceeds a constant value.

When the regular rotation of the rotor is stagnated by the backflow or the like of the process gas of the compressor, the torque of the output shaft of the electric motor is varied (increased). Further, when the force of causing the rotor to transition from the regular rotation to the reverse rotation is increased, the torque is also increased. According to the above-mentioned configuration, the control device can determine that the rotor is likely to be reversely rotated, by detecting that the torque is exceeding a constant value. Accordingly, the control device can control to detect a reverse rotation symptom of the rotor and move the moving gear to the second position before reverse rotation of the rotor starts. For this reason, when the reverse rotation of the rotor actually starts, movement of the moving gear to the second position is terminated. Accordingly, the turning device can be avoided from receiving an excessive load due to reverse rotation of the rotor. In addition, since the control device is configured to automatically control these operations, a work load such as monitoring a state of the rotor by the operator can be reduced.

According to a fourth aspect of the present invention, in any one of the first to third aspects, the turning device further includes a revolution number measurement unit configured to measure a revolution number of the output shaft, and the control device controls the movement mechanism to move the moving gear from the first position to the second position based on the revolution number measured by the revolution number measurement unit.

According to the above-mentioned configuration, even when the control device detects a variation (a decrease) in the revolution number of the rotor, the control device can determine that regular rotation of the rotor is stagnated and the rotor is likely to be reversely rotated. Accordingly, a malfunction in which the control device moves the moving gear can be suppressed by a variation in torque due to factors other than the reverse rotation of the rotor.

Advantageous Effects of Invention

According the turning device of the present invention, the turning device can be prevented from receiving an excessive load upon reverse rotation of the turbine rotor, and the replacement and repair frequency of the turning device can be reduced.

DESCRIPTION OF EMBODIMENTS (Structure of Turning Device)

Hereinafter, a turning device 30 according to the embodiment of the present invention will be described with reference to FIGS. 1 and 2.

The turning device 30 is, for example, a device configured to rotate a turbine rotor 11 of a steam turbine (not shown) at a low speed.

In the embodiment, a wheel gear 12 integrally attached to an outer circumference of the turbine rotor 11 and a revolution number measurement instrument 13 (a revolution number measurement unit) configured to measure a revolution number of the turbine rotor 11 are installed at one end of the turbine rotor 11.

Figure 1:
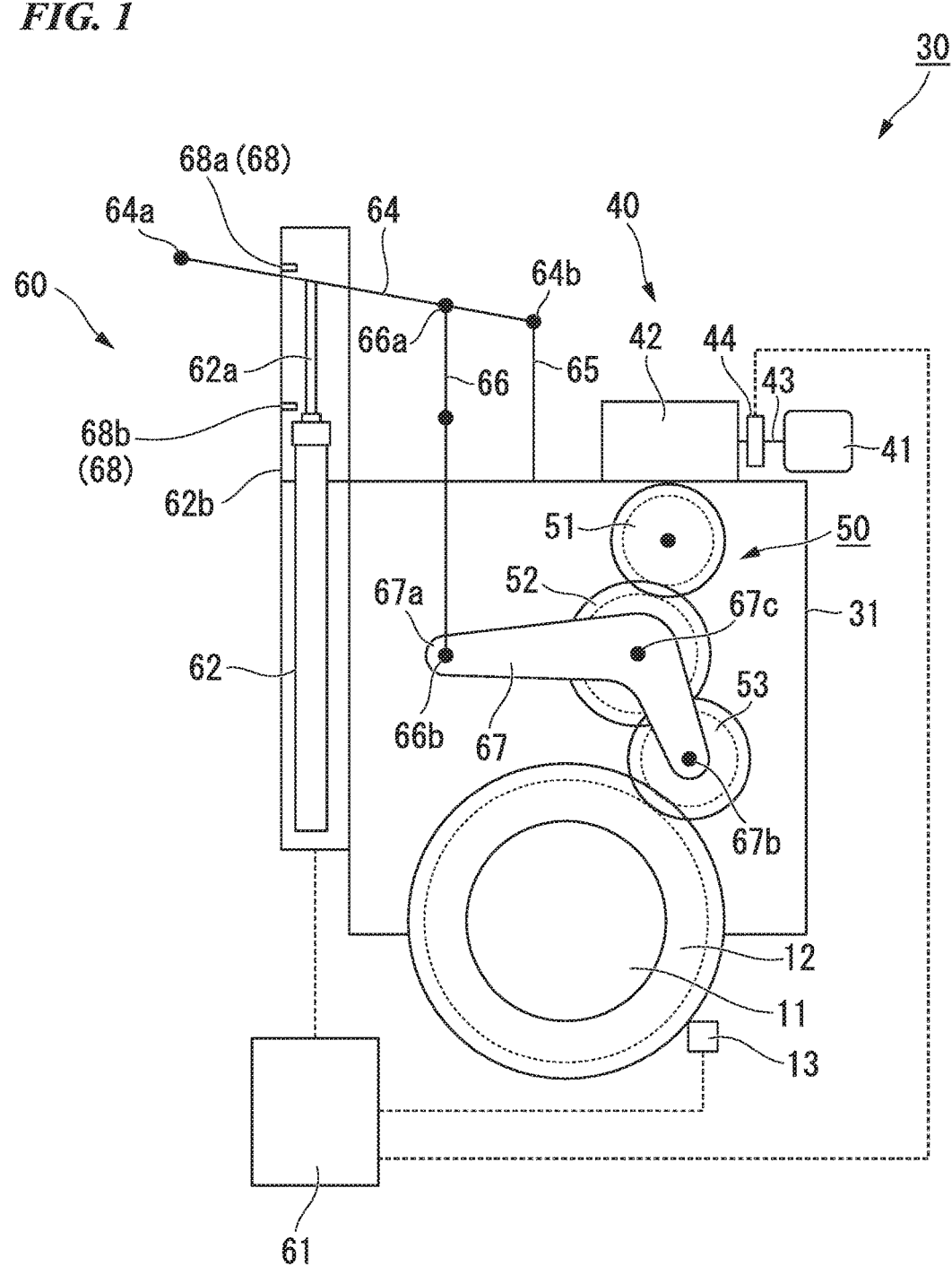
FIG. 1 is a cross-sectional view of a turning device according to an embodiment of the present invention.

As shown in FIG. 1, the turning device 30 includes a casing 31, a power unit 40 and a power transmission unit 50. The turning device 30 is disposed at one end of the turbine rotor 11.

In the embodiment, a left/right direction of FIG. 1 is referred to as a widthwise direction, an up/down direction is referred to as an up/down direction, and an axial direction of the turbine rotor 11 is referred to as an axial direction.

The power unit 40 includes an electric motor 41, an output shaft 43 configured to transmit a rotary driving force of the electric motor 41, a speed reducer 42 configured to reduce the rotary driving force transmitted from the output shaft 43 at a predetermined speed ratio (a speed reduction ratio), and a torque detector 44 (a torque detection unit) installed between the electric motor 41 and the speed reducer 42 and configured to detect a torque of an electric motor. In the embodiment, the power unit 40 is disposed at an upper surface of the casing 31.

The power transmission unit 50 includes an output gear 51, a connecting gear 52 and a moving gear 53. In the embodiment, the power transmission unit 50 is disposed in the casing 31.

A belt (not shown) spans from the speed reducer 42 to the output gear 51, and thus, the rotary driving force is transmitted.

The connecting gear 52 is disposed to be meshed with the output gear 51, below the output gear 51. When the output gear 51 is rotated by the rotary driving force from the power unit 40, the connecting gear 52 is also rotated with the output gear 51.

The moving gear 53 is disposed to be meshed with the connecting gear 52, below the connecting gear 52. The moving gear 53 is rotated according to rotation of the connecting gear 52.

Figure 2:
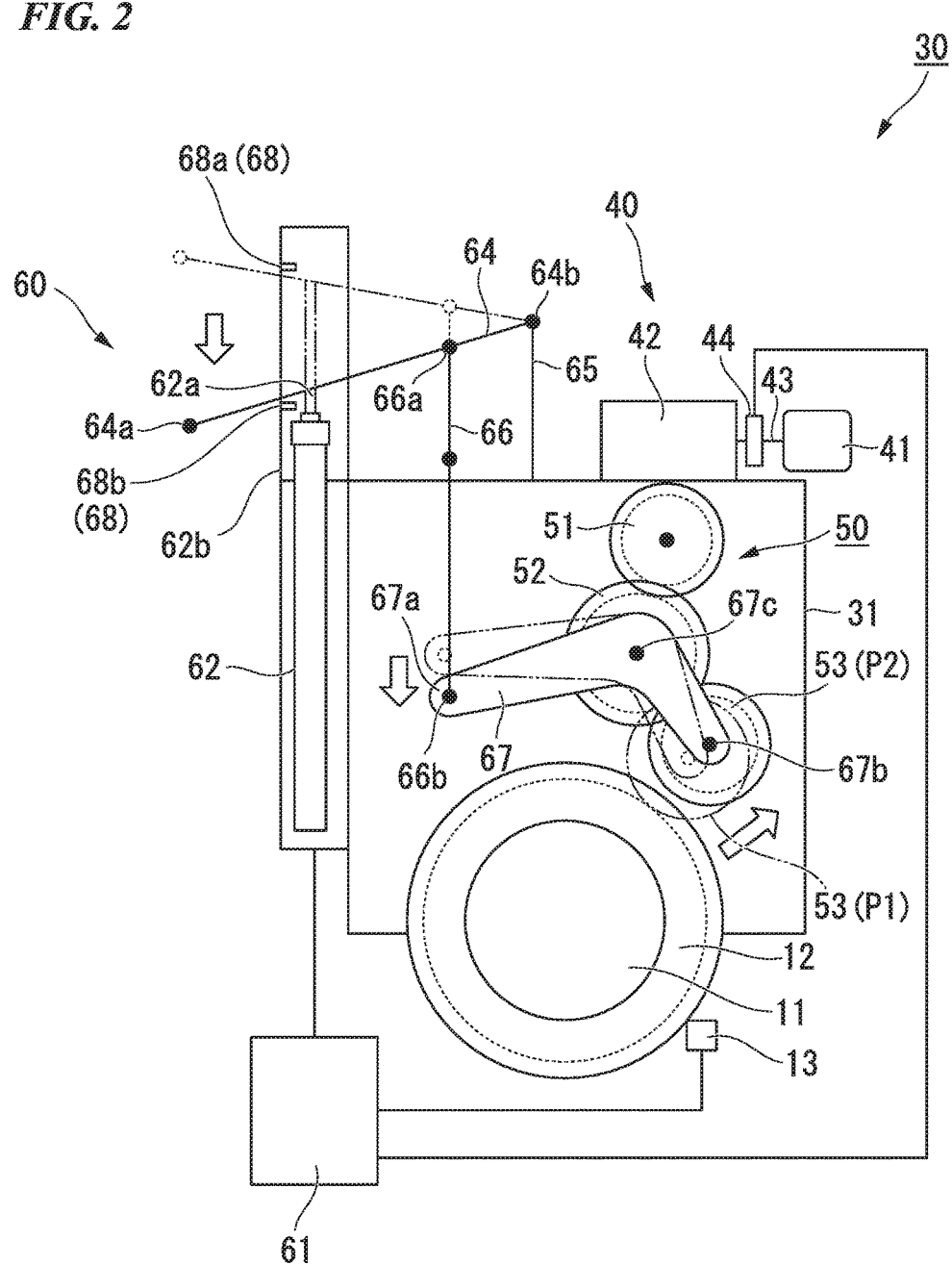
FIG. 2 is a cross-sectional view of the turning device according to the embodiment of the present invention.

In addition, as shown in FIG. 2, the moving gear 53 is configured to be movable between a first position P1 (a position shown by a broken line) meshed with the wheel gear 12 and a second position P2 (a position shown by a solid line), at which meshing with the wheel gear 12 is released, separated from the wheel gear 12 toward the outside in the radial direction, by a movement mechanism 60, which will be described below.

The moving gear 53 is meshed with the wheel gear 12 of the turbine rotor 11 and rotates the wheel gear 12 using the rotary driving force transmitted from the power unit 40 when disposed at the first position P1. The turning device 30 rotates the turbine rotor 11 by rotating the wheel gear 12. In addition, the moving gear 53 does not transmit the rotary driving force transmitted from the power unit 40 to the wheel gear 12 when disposed at the second position P2 because meshing with the wheel gear 12 of the turbine rotor 11 is released.

As shown in FIG. 1, the movement mechanism 60 includes a control device 61, an air cylinder 62, a lever 64, a movement rod 66 and a bracket 67.

In the embodiment, the control device 61 monitors a rotation state of the turbine rotor 11 based on a revolution number of the turbine rotor 11 measured by the revolution number measurement instrument 13 and a torque of the electric motor 41 detected by the torque detector 44. The control device 61 performs control of the air cylinder 62 according to the rotation state of the turbine rotor 11.

The air cylinder 62 is a power source configured to move the moving gear 53 between the first position P1 and the second position P2 according to the control of the control device 61. In the embodiment, the air cylinder 62 is installed at an outer side surface of one side in the widthwise direction of the casing 31.

The air cylinder 62 has a piston rod 62a slidably extending in the up/down direction, and an air cylinder case 62b configured to house the piston rod 62a. An upper end portion of the piston rod 62a extends to a position above the upper surface of the casing 31, and is connected to a first end 64a side of the lever 64 extending in the widthwise direction. In addition, a slit through which the lever 64 is inserted is formed in the up/down direction in a side surface in the widthwise direction of the air cylinder case 62b.

A second end 64b of the lever 64 is tiltably supported by a support section 65 formed at the upper surface of the casing 31. For this reason, as the piston rod 62a of the air cylinder 62 slides in the up/down direction, the first end 64a of the lever 64 connected to the piston rod 62a is moved in the up/down direction using the second end 64b of the lever 64 supported by the support section 65 serving as a support point.

The movement rod 66 extends in the up/down direction, and an upper end 66a is tiltably connected at a position above the upper surface of the casing 31 between a position, at which the lever 64 and the piston rod 62a are connected, and the second end 64b of the lever 64. In addition, a lower end 66b side of the movement rod 66 is inserted into the casing 31. As the lever 64 is tilted according to sliding movement of the piston rod 62a of the air cylinder, the movement rod 66 is moved in the up/down direction according thereto.

The bracket 67 is a plate-shaped member formed in substantially an L shape. A first end 67a of the bracket 67 is tiltably connected to the lower end 66b of the movement rod 66. In addition, a second end 67b of the bracket 67 is connected to a central shaft of the moving gear 53, and an intermediate section 67c is connected to a central shaft of the connecting gear 52. For this reason, in the bracket 67, according to movement of the movement rod 66 in the up/down direction, the first end 67a is moved in the up/down direction and the second end 67b is moved in the radial direction of the wheel gear 12 using the intermediate section 67c as a support point. Specifically, as shown in FIG. 2, when the movement rod 66 is moved in the downward direction, the first end 67a of the bracket 67 is moved in the downward direction and the second end 67b of the bracket 67 is moved toward the outside in the radial direction of the wheel gear 12 using the intermediate section 67c of the bracket 67 as a support point. Here, since the second end 67b of the bracket 67 is connected to the central shaft of the moving gear 53, the moving gear 53 is also moved toward the outside in the radial direction (the second position P2) of the wheel gear 12. In addition, when the movement rod 66 is moved upward, the first end 67a of the bracket 67 is moved upward and the second end 67b of the bracket 67 is moved toward the inside in the radial direction of the wheel gear 12 using the intermediate section 67c of the bracket 67 as a support point. Here, since the second end 67b of the bracket 67 is connected to the central shaft of the moving gear 53, the moving gear 53 is also moved toward the inside in the radial direction (the first position P1) of the wheel gear 12.

In the embodiment, in order to prevent the moving gear 53 from colliding with the wheel gear 12 or an inner wall of the casing 31, a mechanical stopper 68 configured to restrict tilting in the up/down direction of the lever 64 is installed at an inner wall of the air cylinder case 62b. The mechanical stopper 68 has a first mechanical stopper 68a configured to restrict tilting in the upward direction of the lever 64, and a second mechanical stopper 68b configured to restrict tilting in the downward direction. The first mechanical stopper 68a is installed at a position corresponding to the first position P1 of the moving gear 53, and the second mechanical stopper 68b is installed at a position corresponding to the second position P2 of the moving gear 53.

(Action of Turning Device)

Next, an action of the turning device 30 will be described with reference to FIGS. 1 to 3.

First, in the turning-started state (a section A in FIG. 3), the turning device 30 is started and the electric motor 41 is driven. Further, while the turning device is operated, the control device 61 acquires the revolution number of the turbine rotor 11 measured by the revolution number measurement instrument 13 and the torque of the electric motor 41 detected by the torque detector 44 at predetermined intervals.

The rotary driving force of the electric motor 41 is transmitted to the speed reducer 42 through the output shaft 43, and the revolution number is reduced by the speed reducer 42 at a predetermined speed ratio (a speed reduction ratio). In this way, the power unit 40 outputs the rotary driving force to the output gear 51 of the power transmission unit 50 in a state in which the torque is raised to a predetermined value Tr1.

The output gear 51 starts to be rotated by the rotary driving force transmitted from the speed reducer 42, and rotates the connecting gear 52 meshed with the output gear 51. Accordingly, the moving gear 53 meshed with the connecting gear 52 also starts to rotate.

Here, the moving gear 53 is disposed at the first position P1 shown in FIG. 1. That is, the moving gear 53 is meshed with the wheel gear 12 of the turbine rotor 11. For this reason, as the moving gear 53 is rotated, the turbine rotor 11 also starts to be rotated with the wheel gear 12.

Figure 3:
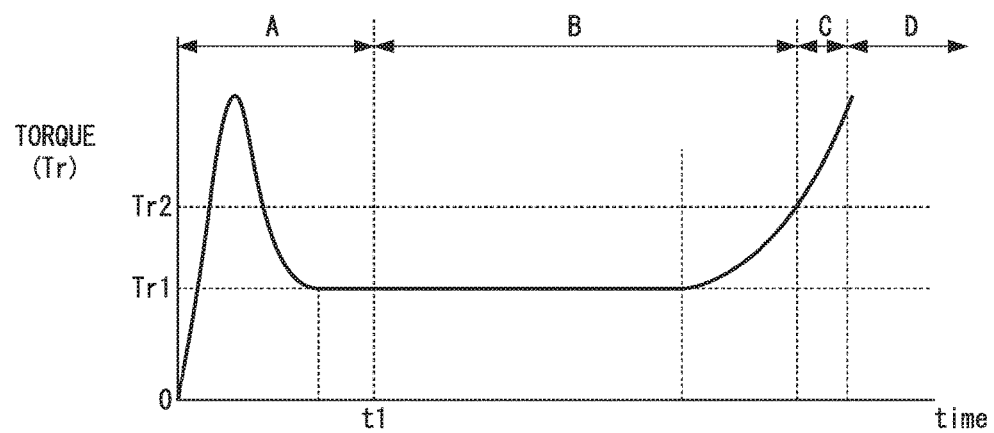
FIG. 3 is a graph showing a variation in torque and revolution number of a turbine rotor according to time elapsed since starting the turning device.
Figure 3:
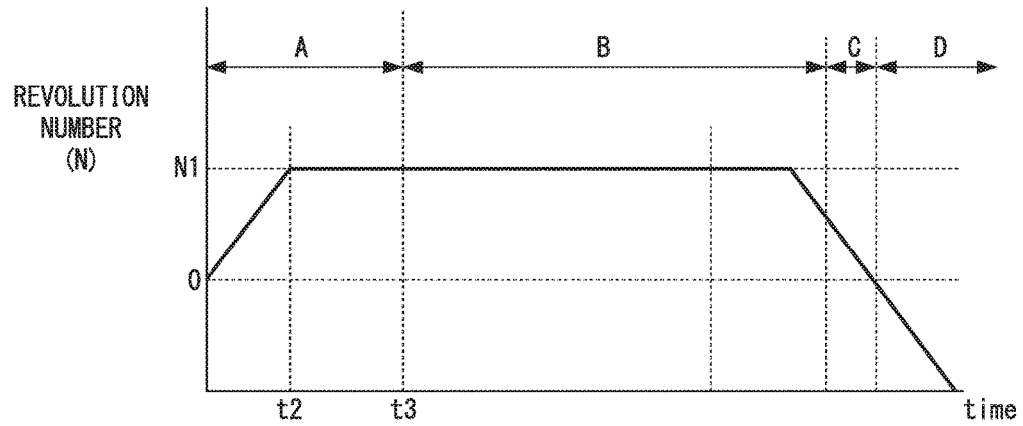

Immediately after starting of the turning device 30, as shown in FIG. 3, the torque that is temporarily raised, and immediately, lowered to the vicinity of the predetermined value Tr1, a so-called starting torque, occurs. In the embodiment, the control device 61 determines that the turning device 30 has transitioned from the turning-started state (A) to a turning state (a section B of FIG. 3) when the torque is maintained for a certain time (to t1 of FIG. 3) at the predetermined value Tr1. Accordingly, the control device 61 determines that an increase in torque immediately after starting of the turning device 30 is a starting torque, and suppresses erroneous detection of the reverse rotation of the turbine rotor 11. Further, the determination of transitioning to the turning state (B) may be determined by instructing the control device 61 by an operation of an operator when the torque is lowered to the predetermined value Tr1 from the starting torque.

In the turning state (B), as shown in FIG. 3, the torque is the predetermined value Tr1, and the revolution number of the turbine rotor 11 is a predetermined value N1. That is, torque displacement per unit time is substantially zero.

However, when a force in a direction of reversely rotating the turbine rotor 11 is generated by a backflow or the like of a process gas of the compressor, it may be difficult to regularly rotate the turbine rotor 11. In this case, as shown in FIG. 3, the torque is raised from the predetermined value Tr1. That is, torque displacement per unit time is increased.

When the control device 61 detects that the torque displacement per unit time exceeds a regulated amount α1, the control device 61 determines that a reverse rotation symptom of the turbine rotor 11 is detected. Accordingly, the control device 61 determines that the state has transitioned from the turning state (B) to a reverse rotation symptom state (a section C of FIG. 3).

In the reverse rotation symptom state (C), as shown in FIG. 3, the torque is increased over the predetermined value Tr1, and the revolution number of the turbine rotor 11 is lowered below the predetermined value N1.

In this state, the control device 61 controls the air cylinder 62 and moves the piston rod 62a in the downward direction as shown in FIG. 2. Accordingly, the lever 64 is tilted in the downward direction and pushes the movement rod 66 down using the second end 64b as a support point. The movement rod 66 is moved in the downward direction and pushes the first end 67a of the bracket 67 down. The bracket 67 pushes the second end 67b up toward the outside in the radial direction of the wheel gear 12 to an extent that the first end 67a is pushed down by the movement rod 66 using the intermediate section 67c as a support point. Accordingly, the moving gear 53 connected to the second end 67b of the bracket 67 is also moved from the first position P1 (a position shown by the broken line of FIG. 2) serving as a position meshed with the wheel gear 12 to the second position P2 (a position shown by the solid line of FIG. 2) serving as an outer side in the radial direction of the wheel gear 12. Accordingly, meshing between the moving gear 53 and the wheel gear 12 is released.

When the force in the direction in which the turbine rotor 11 is reversely rotated is increased by a backflow or the like of the process gas of the compressor and the regular rotation of the turbine rotor 11 cannot be maintained, the state has transitioned from the reverse rotation symptom state (C) to a reverse rotation state (a section D of FIG. 3) of the turbine rotor 11. Here, when the moving gear 53 remains in a state meshed with the wheel gear 12, as shown in FIG. 3, the torque exceeds an upper limit value Tr2, and the revolution number of the turbine rotor 11 becomes a negative value from zero. That is, the turbine rotor 11 starts to be reversely rotated. For this reason, an excessive load in a reverse rotation direction is applied to the moving gear 53 by the turbine rotor 11, and the moving gear 53 may be damaged. In addition, such a load is transmitted from the moving gear 53 to the entire turning device 30, and the turning device 30 may be damaged.

However, in the embodiment, before transitioning to the reverse rotation state (D) of the turbine rotor 11, in a step of the reverse rotation symptom state (C), the moving gear 53 and the wheel gear 12 are operated to release the meshing therebetween. For this reason, even when reverse rotation of the turbine rotor 11 starts, application of an excessive load to the turning device 30 can be avoided.

Next, an effect of the turning device 30 of the embodiment will be described.

As described above, the turning device 30 of the embodiment is configured such that the moving gear 53 is moved from the first position P1 meshed with the wheel gear 12 to the second position P2 disposed at the outside in the radial direction of the wheel gear 12 and not meshed with the wheel gear 12 based on the torque of the electric motor 41 detected by the torque detector 44. Accordingly, before the turbine rotor 11 is reversely rotated, occurrence of damage or the like of the moving gear 53 due to reception of an excessive load caused by reverse rotation of the turbine rotor 11 can be suppressed. In addition, since the turbine rotor 11 is configured to automatically move the moving gear 53 based on the torque, the operator can reduce work loads such as monitoring the state of the turbine rotor 11, execution of an operation of the turning device 30, and so on. In addition, even when the reverse rotation symptom state (C) of the turbine rotor 11 cannot be detected due to oversight or the like of the operator, the probability of the turning device 30 receiving an excessive load due to reverse rotation of the turbine rotor 11 can be reduced. Accordingly, damage of the moving gear 53 or the like meshed with the wheel gear of the turbine rotor 11 can be suppressed, and a replacement and repair frequency of the turning device 30 can be reduced.

As described above, in the turning device 30 of the embodiment, when the torque of the electric motor 41 detected by the torque detector 44 is maintained at the predetermined value Tr1 for a while, the control device 61 determines that the state is the turning state (B). Accordingly, a malfunction of the movement mechanism 60 due to an increase in torque (a starting torque) immediately after starting the turning device 30 can be suppressed. In addition, since the control device 61 automatically detects that the state is the turning state (B), the work loads such as monitoring the state of the turbine rotor 11 by the operator and so on can be reduced.

As described above, in the turning device 30 of the embodiment, when the torque displacement per unit time in the turning state (B) exceeds the regulated amount α1, the control device 61 determines that the state has transitioned to the reverse rotation symptom state (C). Accordingly, the control device 61 can automatically detect the probability of the reverse rotation of the turbine rotor 11, and the operator can reduce work loads such as monitoring the state of the turbine rotor 11 and so on. In addition, since a symptom can be actually detected before reverse rotation of the turbine rotor 11 starts, the probability that the turning device 30 receives an excessive load due to the reverse rotation of the turbine rotor 11 can be reduced. Accordingly, damage to the moving gear 53 or the like meshed with the wheel gear of the turbine rotor 11 can be suppressed, and a replacement and repair frequency of the turning device 30 can be reduced.

Hereinabove, while the embodiment of the present invention has been described in detail, the embodiment is not limited thereto and it is possible that design changes may be made without departing from the technical spirit of the present invention.

For example, in the above-mentioned embodiment, a configuration in which the control device 61 determines that the state is the turning state (B) when the torque of the electric motor 41 detected by the torque detector 44 is maintained at the predetermined value Tr1 for a while has been described. In addition, the configuration in which the control device 61 determines that the state is transited to the reverse rotation symptom state (C) when the torque displacement per unit time in the turning state (B) exceeds the regulated amount α1 has been described. However, the embodiment is not limited to the configuration.

Since the starting torque has extremely large torque displacement per unit time, the control device 61 may determine that the torque displacement per unit time is the starting torque when exceeds a regulated amount α2. That is, the control device 61 may determine that the state has transitioned to the reverse rotation symptom state (C) when the displacement per unit time is a range of the regulated amount α1 or more and the regulated amount α2 or less. Even in the above-mentioned configuration, the same effect as the above-mentioned embodiment can be obtained.

In addition, the control device 61 may determine that the state has transitioned to the reverse rotation symptom state (C) when the torque detected by the torque detector 44 exceeds the upper limit value Tr2 in the turning state (B). Even in the above-mentioned configuration, the same effect as the above-mentioned embodiment can be obtained.

In addition, the control device 61 may determine that the state has transitioned from the turning-started state (A) to the turning state (B) when the revolution number of the turbine rotor 11 reaches the predetermined value N1 and a constant time (for example, a period from t2 to t3 in FIG. 3) elapses. Alternatively, when the revolution number reaches the predetermined value N1, the control device 61 is instructed by an operation of an operator, and the control device 61 may determine that the state has transitioned to the turning state (B). The same effect as the above-mentioned embodiment can also be obtained by the above-mentioned configuration.

In addition, the control device 61 may determine that the state has transitioned to the reverse rotation symptom state (C) when the revolution number of the turbine rotor 11 is decreased below the predetermined value N1 in the turning state (B). The same effect as the above-mentioned embodiment can also be obtained by the above-mentioned configuration.

Further, the control device 61 may determine whether the state has transitioned to the reverse rotation symptom state (C) by combining the determination based on the revolution number of the turbine rotor 11 as described above and the determination based on the torque or the torque displacement per unit time. Even when the control device 61 detects a variation (a decrease) in the revolution number of the turbine rotor 11, it is possible to determine that regular rotation of the turbine rotor 11 has stagnated and the turbine rotor 11 is likely to be reversely rotated. Accordingly, a malfunction in which the control device 61 moves the moving gear 53 by a variation in torque due to factors other than the reverse rotation of the turbine rotor 11 can be suppressed.

INDUSTRIAL APPLICABILITY

According to the above-mentioned turning device, it is possible to suppress the turning device from receiving an excessive load upon reverse rotation of the turbine rotor, and reduce a replacement and repair frequency of the turning device.

REFERENCE SIGNS LIST

11 Turbine rotor (rotor)
12 Wheel gear
13 Revolution number measurement instrument (revolution number measurement unit)
30 Turning device
31 Casing
40 Power unit
41 Electric motor
42 Speed reducer
43 Output shaft
44 Torque detector (torque detection unit)
50 Power transmission unit
51 Output gear
52 Connecting gear
53 Moving gear
60 Movement mechanism
61 Control device
62 Air cylinder
62a Piston rod
62b Air cylinder case
64 Lever
65 Support section
66 Movement rod
67 Bracket
68 Mechanical stopper
68a First mechanical stopper (mechanical stopper)
68b Second mechanical stopper (mechanical stopper)

The invention claimed is:

1. A turning device comprising:
an electric motor;
a moving gear configured to move between a first position at which rotation of an output shaft of the electric motor is able to be transmitted to a rotor and a second position at which rotation of the output shaft is unable to be transmitted to the rotor;
a movement mechanism which includes an air cylinder; a lever that is connected to the air cylinder; and a bracket that has a first end connected to the lever and a second end connected to the moving gear, and which is configured to move the lever by the air cylinder such that the moving gear moves between the first position and the second position;
a torque detector configured to detect a torque of the output shaft of the electric motor; and
a control device configured to output a control signal to the air cylinder to move the moving gear from the first position to the second position based on the torque detected by the torque detector.

2. The turning device according to claim 1, wherein the control device controls the movement mechanism to move the moving gear from the first position to the second position when a displacement per unit time of the torque detected by the torque detector exceeds a constant value.

3. The turning device according to claim 2, further comprising a revolution number measurement unit configured to measure a revolution number of the output shaft,
wherein the control device is configured to output the control signal to the air cylinder to move the moving gear from the first position to the second position based on the revolution number measured by the revolution number measurement unit.

4. The turning device according to claim 1, wherein the control device is configured to output the control signal, to the air cylinder to move the moving gear from the first position to the second position when the torque detected by the torque detector exceeds a constant value.

5. The turning device according to claim 4, further comprising a revolution number measurement unit configured to measure a revolution number of the output shaft,
wherein the control device is configured to output the control signal to the air cylinder to move the moving gear from the first position to the second position based on the revolution number measured by the revolution number measurement unit.

6. The turning device according to claim 1, further comprising a revolution number measurement unit configured to measure a revolution number of the output shaft,
wherein the control device is configured to output the control signal to the air cylinder to move the moving gear from the first position to the second position based on the revolution number measured by the revolution number measurement unit.

\* \* \* \* \*